US012152754B2

(12) United States Patent
Calaceto et al.

(10) Patent No.: US 12,152,754 B2
(45) Date of Patent: Nov. 26, 2024

(54) PENDANT HANGING MOUNT FOR A LIGHTING FIXTURE

(71) Applicant: RAB Lighting Inc., New York, NY (US)

(72) Inventors: Nicholas Calaceto, Paramus, NJ (US); Peter On, Houston, TX (US); Geoffrey Zarzecki, Highland Ranch, CO (US); Stephen Osborne, Glen Arm, MD (US); Frederic Hodshon, Redmond, WA (US)

(73) Assignee: RAB LIGHTING INC., New York, NY (US)

( * ) Notice: Subject to any disclaimer, the term of this patent is extended or adjusted under 35 U.S.C. 154(b) by 226 days.

(21) Appl. No.: 17/740,905

(22) Filed: May 10, 2022

(65) Prior Publication Data

US 2023/0366519 A1 Nov. 16, 2023

(51) Int. Cl.
*F21S 8/06* (2006.01)
*F21V 15/01* (2006.01)
(Continued)

(52) U.S. Cl.
CPC ................ *F21S 8/06* (2013.01); *F21V 15/01* (2013.01); *F21V 21/02* (2013.01); *F21Y 2103/00* (2013.01)

(58) Field of Classification Search
CPC ........... F21S 8/04; F21S 8/026; F21V 21/008; F21V 21/02; F21V 21/048; F21V 19/0005
See application file for complete search history.

(56) References Cited

U.S. PATENT DOCUMENTS 2,432,392 A * 12/1947 De Merritt ................ F21S 8/06 362/265
2,529,990 A * 11/1950 Barker .................... F21V 21/03 362/220

(Continued)

FOREIGN PATENT DOCUMENTS

CN 101852407 A 10/2010
CN 107084343 A * 8/2017 .............. F21S 8/026
KR 200305015 Y1 2/2003

OTHER PUBLICATIONS

Jademar Corp., PVR-LED Series Vandal Resistant LED Canopy Light, Web page: <https://jademar.com/international/pvr-80-led-vandal-resistant-canopy/>, retrieved on Nov. 12, 2021, 2 pages, Miami, FL.

*Primary Examiner* — Fatima N Farokhrooz
(74) *Attorney, Agent, or Firm* — Innovation Law Office; Dennis S. Schell

(57) ABSTRACT

A mount for coupling a lighting fixture to a hanging structure includes an upper section adapted to attach to a pendant or other hanging structure and a lower section adapted to attach to the lighting fixture. The upper section includes an elongate rack and a pair of knuckles. The lower section including an elongate hanger for engaging with the elongate rack to support the lower section and the lighting fixture, including when the lower section is in an open position relative to the upper section during installation and wiring. The lower section also includes a knuckle. A locking member selectively engages the three knuckle to lock the lower section in a closes position relative to the upper section. The mount can further include removeable end covers for enclose opposite ends of the upper section.

21 Claims, 6 Drawing Sheets

(51) Int. Cl.
*F21V 21/02* (2006.01)
*F21Y 103/00* (2016.01)

(56) References Cited

U.S. PATENT DOCUMENTS

| | | | | |
|---|---|---|---|---|
| 2,569,859 | A | 10/1951 | Locke | |
| 4,162,779 | A | 7/1979 | Van Steenhoven et al. | |
| 4,222,093 | A | 9/1980 | Garcia et al. | |
| 4,403,278 | A * | 9/1983 | Flood | F21V 21/112 362/396 |
| 4,837,669 | A | 6/1989 | Tharp et al. | |
| 5,376,020 | A | 12/1994 | Jones | |
| 7,281,867 | B2 * | 10/2007 | Takahashi | F16M 11/10 348/143 |
| 2005/0117333 | A1 * | 6/2005 | Yoshida | F21S 8/04 362/147 |
| 2017/0276332 | A1 * | 9/2017 | Pearson | F21V 21/005 |

* cited by examiner

PENDANT HANGING MOUNT FOR A LIGHTING FIXTURE

TECHNICAL FIELD

Embodiments of this disclosure relate generally to mounts for lighting fixtures, and more particularly to pendant and ceiling mounting systems for lighting fixtures.

BACKGROUND

When installing a lighting fixture suspended from a ceiling using a pendant style mount, it can be difficult to support the lighting fixture while making electrical supply connections. For example, the pendant may be a conduit that is used to support the weight of the lighting fixture and to carry internally the electrical cable to power the lighting fixture. Often the mount is such that the electrical connections must be completed before the mechanical connection between the pendant and the light fixture can be completed, thus requiring the lighting fixture to be supported by another means while held in close proximity to the pendant during wiring. In many installations having high ceilings, including, for example, in warehouses, the location of the lighting fixture adds further difficulty in supporting the lighting fixture during wiring. Often the installer is standing on a ladder or a lift which may not accommodate the assistance of another person or mechanical stand to support the lighting fixture during wiring.

It was appreciated by the inventors of the present disclosure that advantages can be realized by overcoming these obstacles. The present disclosure is responsive to at least such an endeavor and at least one embodiment is directed to one or more of the problems or issues set forth above, and may be directed to others problems as well.

SUMMARY

Embodiments of the present disclosure provide a mount for coupling a lighting fixture to a pendant or other hanging structure. An upper section is adapted to attach to the pendant or other hanging structure and a lower section is adapted to attach to the lighting fixture. The upper section includes an elongate rack and a pair of knuckles. The lower section includes an elongate hanger for engaging with the elongate rack to support the lower section and the lighting fixture, including when the lower section is in an open position relative to the upper section during installation and wiring. The lower section also includes a knuckle. A locking member, for example, a pin, selectively engages the three knuckle to lock the lower section in a closes position relative to the upper section. The mount can further include removeable end covers for enclose opposite ends of the upper section.

In one illustrative embodiment, a mount for coupling a lighting fixture to a hanging structure, includes: an upper section adapted to attach to the hanging structure, the upper section including an elongate rack and at least a first knuckle, the at least a first knuckle defining a first bore; a lower section adapted to attach to the lighting fixture, the lower section including an elongate hanger and at least a second knuckle, the at least a second knuckle defining a second bore; and a locking member sized to be inserted axially within at least a portion of the first bore and the second bore; and wherein: the elongate rack defines a recess for releasably receiving and supporting an end of the elongate hanger; the lower section is supported by the elongate hanger engaged upon the recess of the elongate rack when the upper section is rotated to an open position relative to the lower section and the locking member is extracted from at least one of the first and second bores, thereby providing access between the lower second and the upper section; and the lower section is supported by the elongate hanger engaged upon the recess of the elongate rack when the upper section is rotated to a closed position relative to the lower section and the locking member is axially engaged to be located simultaneously within at least a portion of the first bore and the second bore, thereby reducing access between the lower second and the upper section.

The upper section can comprise a housing. The housing can include a top, a first side, and a second side, the first side can define the at least a first knuckle along a bottom edge; and the second side can define the elongate rack along a bottom edge. The hanging structure can comprise a pendant and a top of the housing can define a bore therethrough for securing the housing to the pendant. The lower section can comprise a plate forming a bottom for the upper section; and the upper section can be uniform in cross-section from a first to a second end so that it may be formed by extrusion.

The at least a second knuckle can be defined along one side of the plate and the elongate hanger can be defined along an opposite side of the plate. The plate can define an opening therethrough between the at least a second knuckle and the elongate hanger. The mount can further comprise fasteners for securing the plate to a top of the lighting housing. The mount can further comprise a first end cover for enclosing an end of the upper section, the first end cover defining a base for securing a proximate end of the locking member to the first end cover; and wherein withdrawing the first end cover from the end of the upper section extracts the locking member from the bore of the as least a second knuckle.

The locking member can define a slot along a portion of its length, the slot not extending to the distal end of the locking member; and the at least a first knuckle can include a retaining pin positioned to extend into the slot, the retaining pin extending into the slot preventing the locking member from being axial withdrawn from the bore of the at least a first knuckle.

The mount can further comprise a removeable first end cover for enclosing an end of the upper section, an interior side of the first end cover defining at least a first pair of tines, each of the at least a first pair of tines engaging within one of a pair of receiver channels defined by the upper section, the engagement of the first pair of tines with the pair of receiver channel releasably securing the removeable first end cover to the upper section.

The mount can further comprise a removeable second end cover for enclosing an opposite end of the upper section, an interior side of the second end cover defining at least a second pair of tines, each of the at least a second pair of tines engaging within one of the pair of receiver channels defined by the upper section, the engagement of the second pair of tines with the pair of receiver channel releasably securing the removeable second end cover to the upper section. The upper section can further include at least a third knuckle defining a third bore axially aligned with and spaced apart from the first bore of the at least a first knuckle; a space can be defined between the at least a first knuckle and the at least a third knuckle sized to receive the second knuckle therebetween; and the lower section can be rotated to a closed position relative to the upper lower section and the locking member can be axially engaged to be located simultaneously within at least a portion of the first bore, the second bore, and the third bore, thereby securing the lower section to the upper section in the closed position.

Another illustrative embodiment of a mount for coupling a lighting fixture to a hanging structure comprises: an upper section adapted to attach to the hanging structure, the upper section including an elongate rack and at least a first knuckle; a lower section adapted to attach to the lighting fixture, the lower section including an elongate hanger and at least a second knuckle; and a locking member selectively engageable with the at least a first knuckle and the at least a second knuckle; and a removeable first end cover for enclosing an end of the upper section; and wherein the elongate rack defines a recess for releasably receiving and supporting an end of the elongate hanger.

The mount can further comprise a removeable second end cover for enclosing an opposite end of the upper section. The first end cover can define a base for securing a proximate end of the locking member to the first end cover; and withdrawing the first end cover from the end of the upper section can extract the locking member from the as least a second knuckle, thereby freeing a side of the lower section to swing open with the elongate hanger supported in the recess of the elongate rack. An interior side of the first end cover can define at least a first pair of tines, each of the at least a second pair of tines can engage within one of a pair of receiver channels defined by the upper section, the engagement of the first pair of tines with the pair of receiver channel can releasably secure the removeable first end cover to the upper section.

The locking member can define a slot along a portion of its length, the slot not extending to the distal end of the locking member; and the at least a first knuckle can include a retaining pin positioned to extend into the slot, the retaining pin extending into the slot preventing the locking member from being axial withdrawn from the bore of the at least a first knuckle. The at least a first knuckle can define a first bore adapted to receive the locking member; and the at least a second knuckle defines a second bore adapted to receive the locking member. The locking member can include a spring plunger mounted with one of the first and second knuckles, a distal end of the spring plunger can releasably engage a recess of the other one of the first and second knuckles. The upper section can further include at least a third knuckle axially aligned with and spaced apart from the at least a first knuckle; a space defined between the at least a first knuckle and the at least a third knuckle can be sized to receive the second knuckle therebetween; and the lower section can be rotated to a closed position relative to the upper section and the locking member can be engaged with the at least a first knuckle, the at least a second knuckle, and the at least a third knuckle, thereby securing the lower section to the upper section in the closed position.

In another illustrative embodiment, a mount for coupling a lighting fixture to a hanging structure comprises: an upper section adapted to attach to the hanging structure, the upper section including an elongate rack and at least a first knuckle; a lower section adapted to attach to the lighting fixture, the lower section including an elongate hanger and at least a second knuckle; and a locking member selectively engageable with the at least a first knuckle and the at least a second knuckle; and a removeable first end cover for enclosing an end of the upper section; and a removeable second end cover for enclosing an opposite end of the upper section; and wherein: the elongate rack can define a recess for releasably receiving and supporting an end of the elongate hanger; the first end cover can define a base for securing a proximate end of the locking member to the first end cover; and withdrawing the first end cover from the end of the upper section can extract the locking member from the as least a second knuckle, thereby freeing a side of the lower section to swing open with the elongate hanger supported in the recess of the elongate rack.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein does not necessarily address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and sub-combinations. All such useful, novel, and inventive combinations and sub-combinations are contemplated herein, it being recognized that the explicit expression of each of these combinations is unnecessary.

DETAILED DESCRIPTION OF THE ILLUSTRATED EMBODIMENTS

Figure 1:
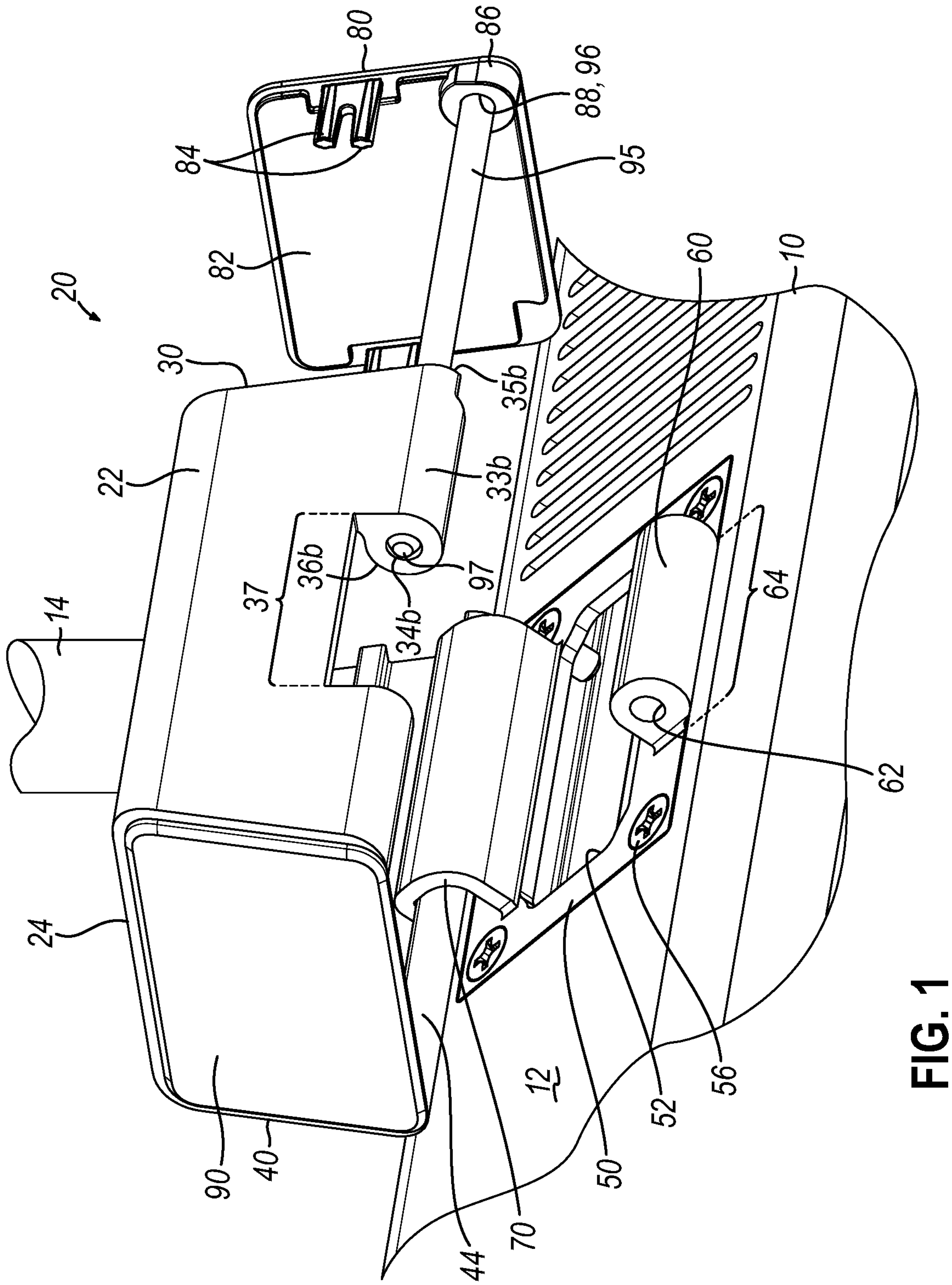
FIG. 1 is a perspective view of an illustrative embodiment of a mount according to the present disclosure, shown during installation with a pendant and a lighting fixture, and with the mount in an open, hanging position.

For the purposes of promoting an understanding of the principles of the disclosure, reference will now be made to one or more embodiments, which may or may not be illustrated in the drawings, and specific language will be used to describe the same. It will nevertheless be understood that no limitation of the scope of the disclosure is thereby intended; any alterations and further modifications of the described or illustrated embodiments, and any further applications of the principles of the disclosure as illustrated herein are contemplated as would normally occur to one skilled in the art to which the disclosure relates. At least one embodiment of the disclosure is shown in great detail, although it will be apparent to those skilled in the relevant art that some features or some combinations of features may not be shown for the sake of clarity.

Any advantages, objects, or similar words used herein are not to be construed as limiting to any of the claims. The usage of words indicating preference, such as "preferably," refers to features and aspects that are present in at least one embodiment, but which are optional for some embodiments.

Specific quantities (spatial dimensions, temperatures, pressures, times, force, resistance, current, voltage, concentrations, wavelengths, frequencies, heat transfer coefficients, dimensionless parameters, etc.) may be used explicitly or implicitly herein, such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated.

Referring to FIG. 1, an illustrative embodiment of a mount 20 according to the current disclosure is shown coupling a lighting fixture 10 to a ceiling pendant 14 during an installation step, for example during connecting of power supply wires. The mount 20 includes generally a housing or upper section 22, a bottom plate or lower section 50, a first end cover 80, a second end cover 90, and a locking member 95, for example, a pin. Advantageously, the lower section 50 includes an elongate hanger 70 that can be releasably hung from and supported by an elongate rack 44 of the upper section. For example, as shown during installation in FIG. 1, the upper section 22 is attached to the pendant 14 and the lower section 50 is attached to the lighting fixture 10. The center of weight of the lighting fixture 10 is off center of the lower section 50, allowing the lower section to swing downwards along one edge, away from the upper section 22 and into an open position. The open position of lower section 50 relative to upper section 22 illustrated in FIG. 1 provides access to an interior of the mount 20 for installation, for example to electrically connect supply power wires (not shown) extending from pendant 14 to power supply input wiring (not shown) of the lighting fixture 10.

When installation of wiring and any related steps is complete, the lower section 50 and lighting fixture 10 can be swung upward into a closed position as shown in FIG. 2, as will be described further below.

Figure 3:
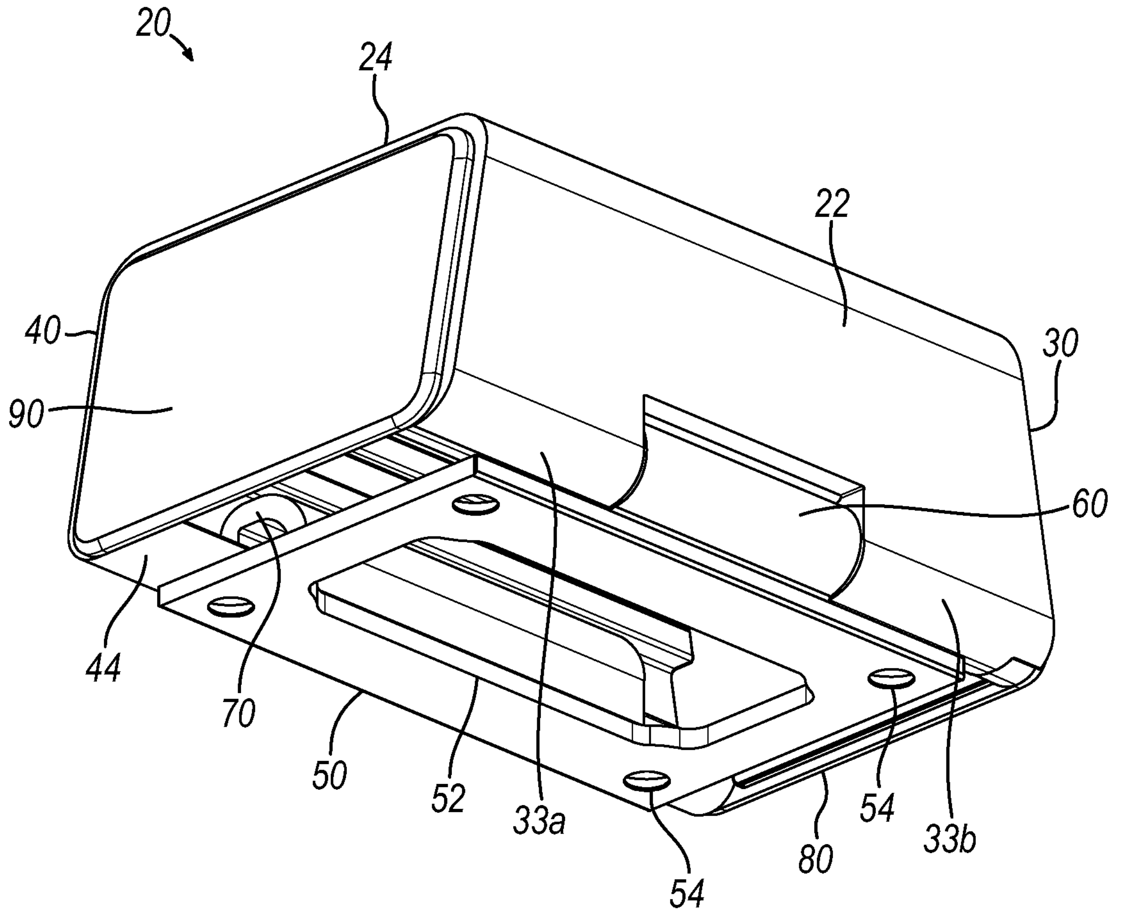
FIG. 3 is a bottom perspective view of the mount of FIG. 1.
Figure 4:
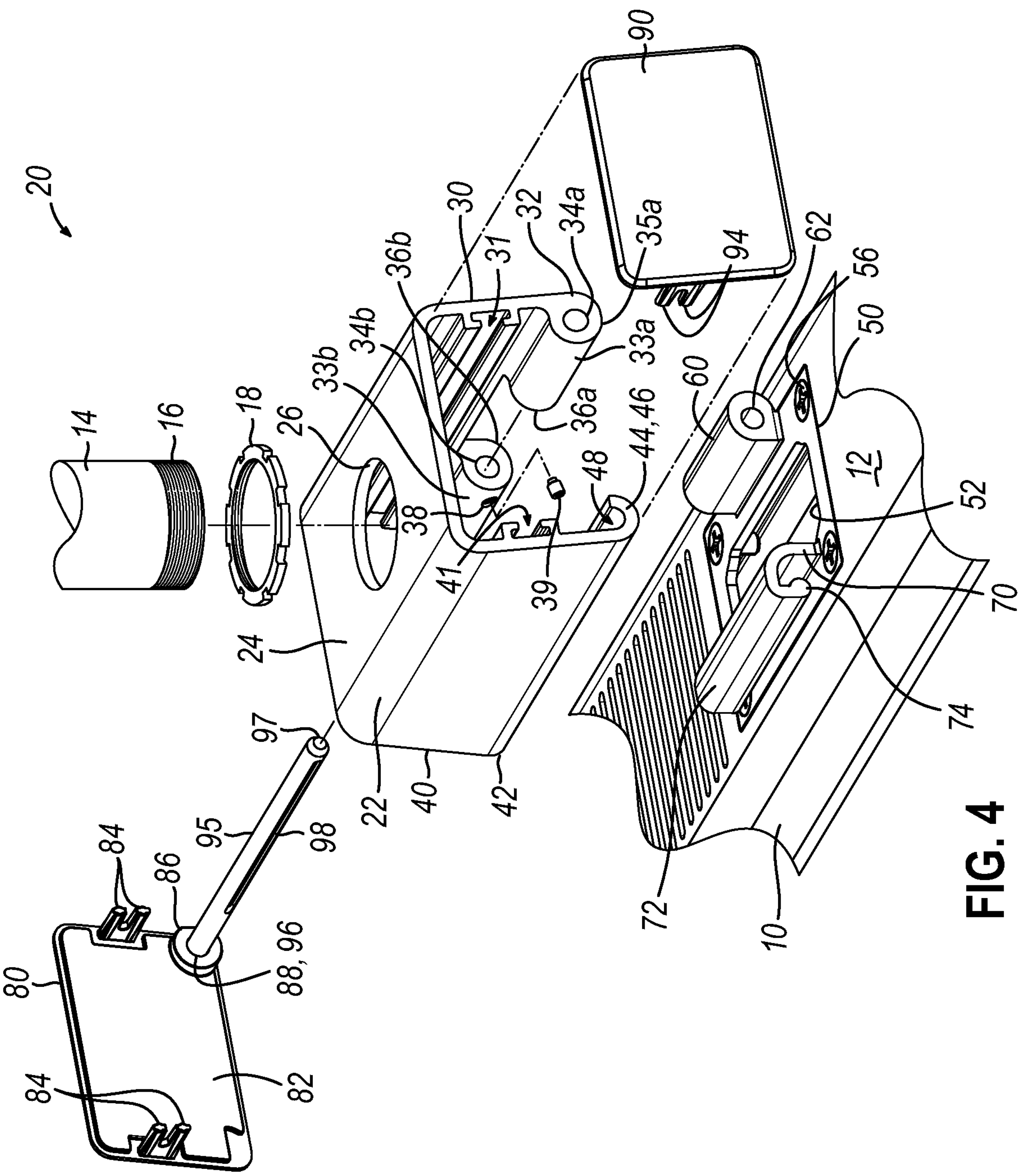
FIG. 4 is an exploded perspective view of the mount, pendant, and lighting fixture of FIG. 1.

Referring now to FIGS. 3 and 4, the lower section 50 may include bores 54 and fasteners 56 for securing the lower section 50 to the top surface 12 of the lighting fixture 10. Other fasteners or other means of securing the lower section 50 to the lighting fixture also known in the art may alternatively be used. In at least one alternative embodiment, the features of the lower section 50 discussed below may be integral with or otherwise incorporated into the top surface 12 of the lighting fixture 10.

Advantageously, the lower section 50 may include a wiring passageway 52 defined therethrough. The elongate hanger 70 that extends across a substantial portion of or the entire length of the lower section 50 includes a hanger body, for example in arcuately shaped flange, thus forming a hook shape in cross-section, and a hanger end 74. The hanger end 74 is received by recess 48 of the elongate rack 44 of the upper section 22, thus supporting the lower section 50 upon the upper section 22.

The lower section 50 includes a knuckle, also commonly known as a barrel, for example, similar to but not limited to those found in various types of hinges and shaped to receive a pin or other locking member therein. Knuckle as used here is more broadly particularly defined below. The knuckle 60 includes an opening, for example a bore 62 therethrough, for selectively receiving the locking member 95 therein. In alternative embodiments, the lower section 50 may include two or more spaced apart knuckles 60. In the illustrative embodiment, the knuckle 60 is centered between ends of and is located along one edge of the lower section 50, and the elongated hanger 70 is located along the opposite edge, though other arrangements of these features of the lower section are contemplated.

In the illustrative embodiment, upper section 22 comprises a housing closed by end sections 80 and 90 and lower section 50, similar to an electrical junction box. Thus the upper section 22 includes top 24, first side 30, and second side 40. The top 24 is adapted for coupling with a mounting structure, for example a conduit like pendant 14 or a ceiling or other mounting structure (not shown). For example, in the illustrative embodiment, top 24 defines an opening 26 that receives a threaded end 16 of the pendant 14, and which may be secured together with one or more fasteners 18, for example using one or more conduit locknuts or other means of securing pendants with a housing known in the art. In an alternative embodiment, the opening 26 is threaded to correspond with and couple with the threads 16 of the pendant 14 or of other mounting structure.

Figure 2A:
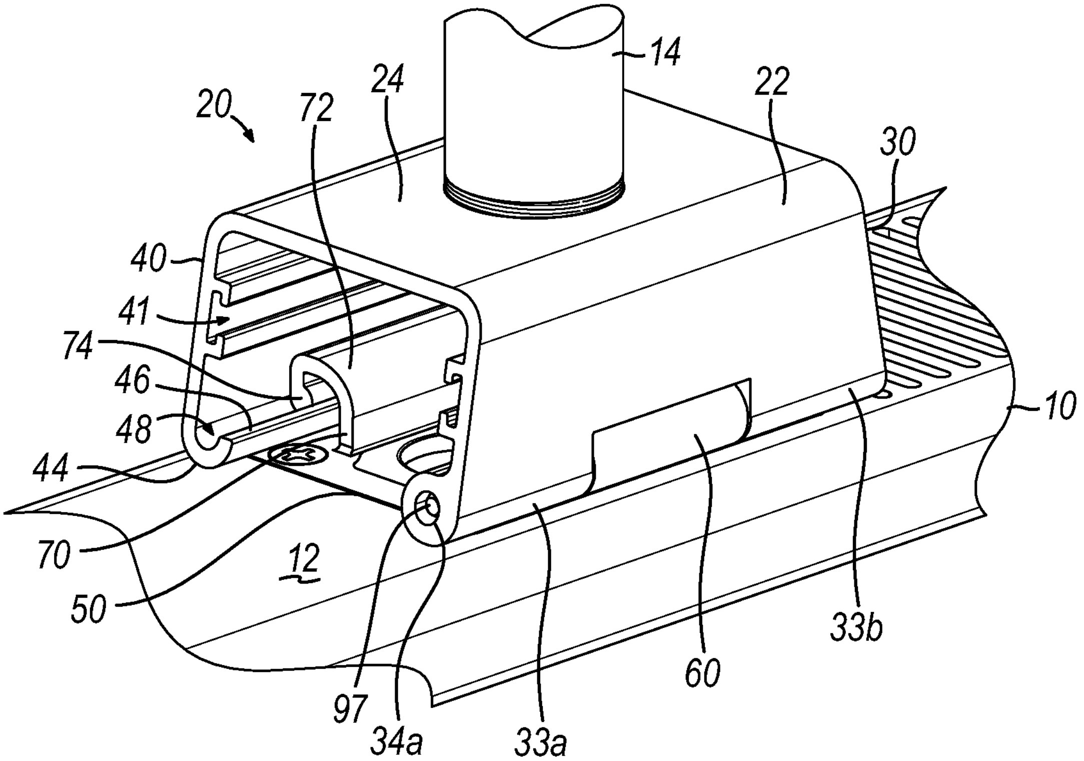
FIG. 2A is a top perspective view of the mount of FIG. 1, shown during installation with an end cover removed.
Figure 2B:
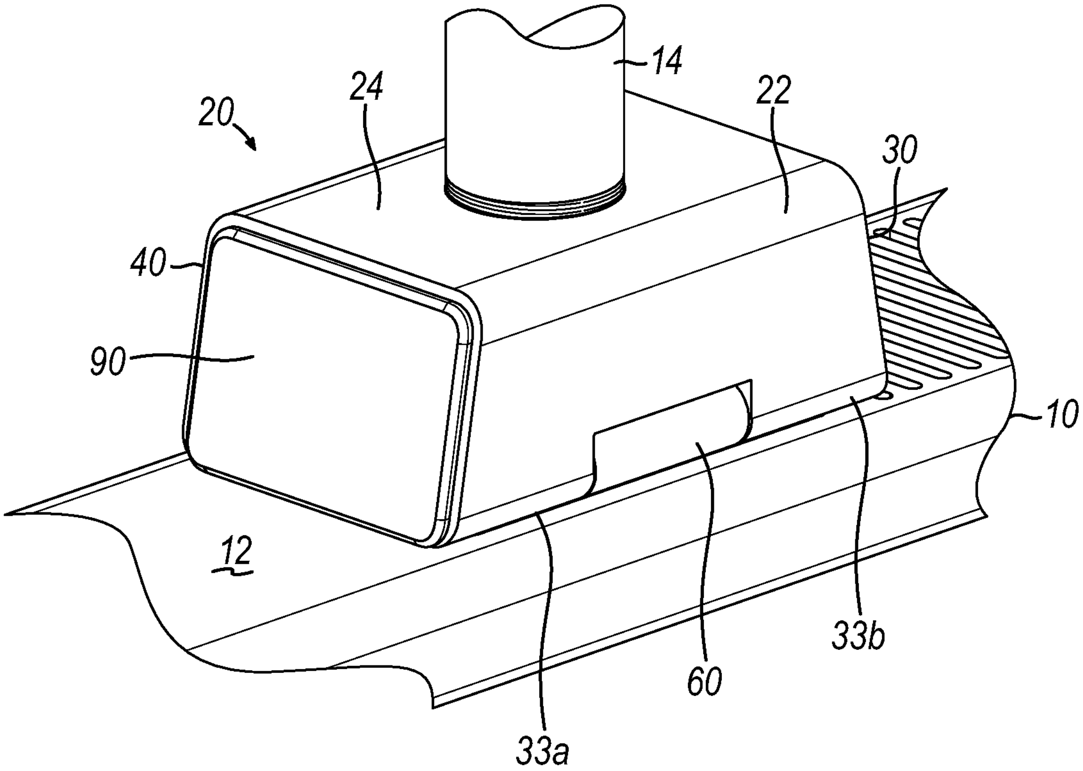
FIG. 2B is a top perspective view of the mount of FIG. 1, shown after installation is completed.

A pair of spaced apart knuckles 33*a-b* are located along the bottom edge 32 of the first side 30 of the upper section 22. As shown in FIG. 1, a space 37 between central knuckle ends 36*a-b* is sized to receive the length 64 of the knuckle 60 upon swinging the lower section 50 closed relative to the upper section 22, as is shown in FIGS. 2A-B. Knuckles 33*a-b* also include bores 34*a-b* sized to slidingly and releasably receive the locking member 95 therein. In at least one embodiment, the upper section 22 includes only a single knuckle 33*a*. In at least another embodiment, the upper section 22 and the lower section 50 each include multiple knuckles 33*a-b*, 60.

As can be understood by comparing FIG. 1, illustrating the mount 30 in the open installation position, and FIG. 2A, illustrating the mount in the closed position, the proximate end 96 of locking member 95 may be mounted within a bore 88 of a base 86 of the end cover 80. This mounting of the locking member 95 to the end cover 80 facilitates the functionality of the end cover as an extractor/introducer for the locking member 95 within the central knuckle 60 and the end knuckle 33*a*. For example, in FIG. 1 a distal end 97 of the locking member 95 is shown within the bore 34*b* of the knuckle 33*b*, thus providing clearance in space 37 for central knuckle 60 to be received between and axially aligned with knuckles 33*a-b* as the lower section 50 is swung upwardly with the attached lighting fixture 10. In contrast, as shown in FIG. 2A, the distal end 97 of the locking member 95 is shown adjacent the outer knuckle end 35*a* of end knuckle 33*a*, thus the locking member 95 extends within bore 62 of the central knuckle 60 and bore 34*a* of end knuckle 33*a*, locking the lower section 50 in the closed position relative to the upper section 30. In the closed position, the end cover 80 encloses one end of the upper section 22.

Advantageously, the knuckle 33*b* may include a bore 38 for receiving a retaining pin 39 therein. Retaining pin 39 extends within the board 34*a* and engages within slot 98 defined along a portion of the length of locking member 95, but not extending to the distal end 97. The engagement of the retaining pin 39 within the slot 98 functions to prevent the locking member 95 and end cover 80 from fully separating from the upper section 22 of the mount 20. The retaining pin 39 and slot 98 of locking member 95 thus act as a retainer for the locking member and end cover 80 to the upper section 22.

An interior surface of each side 30 and 40 may also define receiver channels 31 and 41 for releasably receiving one of a pair of tines 84 and 94 respectively extending from the end covers 80 and 90. For example, the tines 84 and 94 may define a tapered shape that tightens the tines within the receiving channels as the end caps 80 and 90 couple against the ends of and enclose the upper section 22. Located along bottom edge 42 of the second side 40 of the upper section 22, an arcuate flange 46 defines a recess 48 of the elongate rack 44. The hanger end 74 of the lower section 50 is releasably supported by elongate rack 44 by receiving the hanger end within the recess 48. Advantageously, in the illustrated embodiment, the design of features of upper section 22 as illustrated in the figures enable forming of the upper section by extruding material, for example an aluminum or other metal alloy. For example, the features of the upper section 22 may have a consistent cross-section from end-to-end and thus along top 24 and sides 30 and 40. Lower section 50 and end caps 80 and 90 may be constructed of the same or an alternative material, for example, a rigid material.

Although the knuckles 33*a*-*b* and 60 in the illustrative embodiment are generally cylindrical with a cylindrical bore 34*a*-*b* and 62, other shapes for the outer surface and/or bore of the knuckles are within the scope of the term knuckle as defined and used herein, including non-symmetrical shapes. For example, locking member 95 can be symmetrical or non-symmetrical in cross-section other than the cylindrical pin of the illustrative embodiment, and bores 34*a*-*b* and 62 are optionally shaped accordingly to receive the locking member. Additionally, although the knuckles 33*a*-*b* and 60 forms a closed structure fully surrounding the bores 34*a*-*b* and 62 in the illustrative embodiments, i.e., extend 360 degrees around the bore, the knuckle may alternatively be formed by a loop of material formed through more than 180 degrees, for example but not limited to extending about 270 degrees around the locking member 95, thus lockingly receiving member 95 such that the locking member may not escape radially from the bore.

Figure 5:
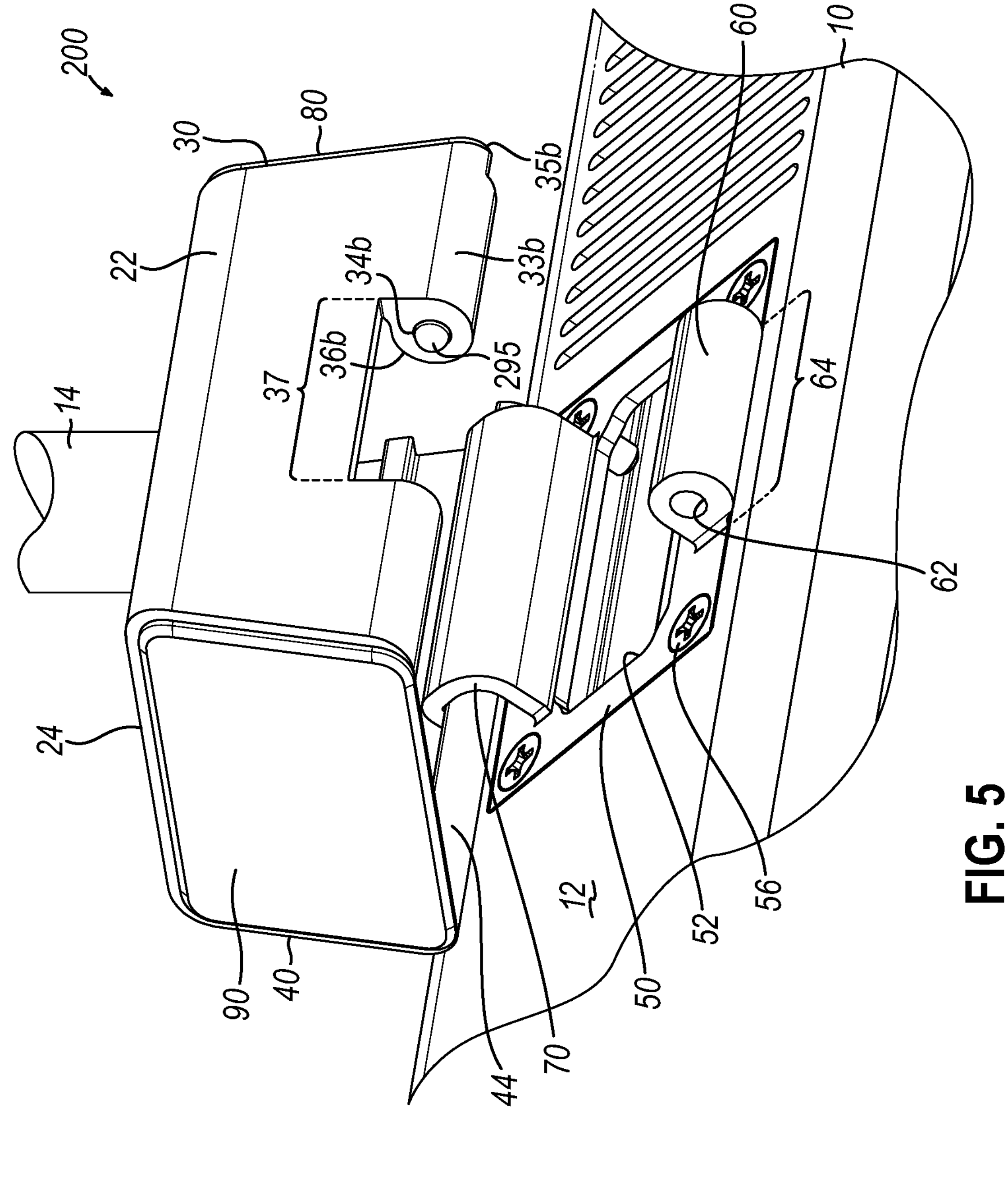
FIG. 5 is a perspective view of another illustrative embodiment of a mount according to the present disclosure, shown during installation with a pendant and a light fixture, with the mount in an open, hanging position.

Referring to FIG. 5, an alternative embodiment mount 200 is illustrated. The primary difference from mount 200 is that locking member 95 is replaced with a different locking member 295 which comprises a spring loaded member, the end of which extends from one or more of bore 34*b*, 62, and/or 34*a*. For example, locking member 295 may be a spring plunger, such as ball or pin plunger, the distal end of which may be compressed within the respective bore when sufficient force is used to move the upper section 22 of mount 200 from a closed to an open position, or from an open to a closed position relative to lower section 50, as is further described above. Using a locking member 295 with a sufficient spring force maintains the mount 200 in the closed position as shown in FIG. 2B, under the weight of the light fixture 10 to which lower section 50 is attached. Additionally, the end cover 80 of mount 200 may be releasable or fixed, but optionally may not provide the same retention/extractor feature as with mount 20.

In at least one embodiment any of bore 34*a*, 34*b*, and 62 may be a recess for receiving a distal end of locking member 295 from an adjacent knuckle 33*a*, 33*b*, or 60, to releasably lock the lower section 50 in a closed position relative to the upper section 22.

Reference systems that may be used herein can refer generally to various directions (e.g., upper, lower, forward and rearward), which are merely offered to assist the reader in understanding the various embodiments of the disclosure and are not to be interpreted as limiting. Other reference systems may be used to describe various embodiments, such as referring to the direction of projectile movement as it exits the firearm as being up, down, rearward or any other direction.

While examples, one or more representative embodiments and specific forms of the disclosure have been illustrated and described in detail in the drawings and foregoing description, the same is to be considered as illustrative and not restrictive or limiting. The description of particular features in one embodiment does not imply that those particular features are necessarily limited to that one embodiment. Some or all of the features of one embodiment can be used in combination with some or all of the features of other embodiments as would be understood by one of ordinary skill in the art, whether or not explicitly described as such. One or more exemplary embodiments have been shown and described, and all changes and modifications that come within the spirit of the disclosure are desired to be protected.

What is claimed is:

1. A mount for coupling a lighting fixture to a hanging structure, comprising:

an upper section adapted to attach to the hanging structure, the upper section including an elongate rack and at least a first knuckle, the at least a first knuckle defining a first bore;

a lower section adapted to attach to the lighting fixture, the lower section including an elongate hanger and at least a second knuckle, the at least a second knuckle defining a second bore; and a locking member sized to be inserted axially within at least a portion of the first bore and the second bore; and wherein:

the elongate rack defines a recess for releasably receiving and supporting an end of the elongate hanger;

the lower section is supported by the elongate hanger engaged upon the recess of the elongate rack when the upper section is rotated to an open position relative to the lower section and the locking member is extracted from at least one of the first and second bores, thereby providing access between the lower section and the upper section; and the lower section is supported by the elongate hanger engaged upon the recess of the elongate rack when the upper section is rotated to a closed position relative to the lower section and the locking member is movable axially along its longitudinal axis to be engaged simultaneously within at least a portion of the first bore and the second bore, thereby reducing access between the lower section and the upper section.

2. The mount of claim 1, wherein the upper section comprises a housing.

3. The mount of claim 1, wherein:

the lower section comprises a plate forming a bottom for the upper section; and the upper section is uniform in cross-section from a first to a second end so that it may be formed by extrusion.

4. The mount of claim 1, further comprising:

a first end cover for enclosing an end of the upper section, the first end cover defining a base for securing a proximate end of the locking member to the first end cover; and wherein withdrawing the first end cover from the end of the upper section extracts the locking member from the bore of the as least a second knuckle.

5. The mount of claim 1, further comprising:

a removeable first end cover for enclosing an end of the upper section, an interior side of the first end cover defining at least a first pair of tines, each of the at least a first pair of tines engaging within one of a pair of receiver channels defined by the upper section, the engagement of the first pair of tines with the pair of receiver channel releasably securing the removeable first end cover to the upper section.

6. The mount of claim 1, wherein:

the upper section further includes at least a third knuckle defining a third bore axially aligned with and spaced apart from the first bore of the at least a first knuckle;

a space defined between the at least a first knuckle and the at least a third knuckle is sized to receive the second knuckle therebetween; and the lower section can be rotated to a closed position relative to the upper lower section and the locking member is movable axially along its longitudinal axis to be engaged simultaneously within at least a portion of the first bore, the second bore, and the third bore, thereby securing the lower section to the upper section in the closed position.

7. The lighting fixture mount of claim 2, wherein:

the housing includes a top, a first side, and a second side;

the first side defines the at least a first knuckle along a bottom edge; and the second side defines the elongate rack along a bottom edge.

8. The mount of claim 2, wherein the hanging structure comprising a pendant and a top of the housing defines a bore therethrough for securing the housing to the pendant.

9. The mount of claim 3, wherein the at least a second knuckle is defined along one side of the plate and the elongate hanger is defined along an opposite side of the plate, and the plate defines an opening therethrough between the at least a second knuckle and the elongate hanger.

10. The mount of claim 3, further comprising fasteners for securing the plate to a top of the lighting housing.

11. The mount of claim 4, wherein:

the locking member defines a slot along a portion of its length, the slot not extending to the distal end of the locking member; and the at least a first knuckle includes a retaining pin positioned to extend into the slot, the retaining pin extending into the slot preventing the locking member from being withdrawn from the bore of the at least a first knuckle.

12. The mount of claim 5, further comprising:

a removeable second end cover for enclosing an opposite end of the upper section, an interior side of the second end cover defining at least a second pair of tines, each of the at least a second pair of tines engaging within one of the pair of receiver channels defined by the upper section, the engagement of the second pair of tines with the pair of receiver channel releasably securing the removeable second end cover to the upper section.

13. A mount for coupling a lighting fixture to a hanging structure, comprising:

an upper section adapted to attach to the hanging structure, the upper section including an elongate rack and at least a first knuckle;

a lower section adapted to attach to the lighting fixture, the lower section including an elongate hanger and at least a second knuckle; and a locking member selectively engageable with the at least a first knuckle and the at least a second knuckle; and a removeable first end cover for enclosing an end of the upper section; and wherein the elongate rack defines a recess for releasably receiving and supporting an end of the elongate hanger.

14. The mount of claim 13, further comprising a removeable second end cover for enclosing an opposite end of the upper section.

15. The mount of claim 13, wherein:

the first end cover defines a base for securing a proximate end of the locking member to the first end cover; and withdrawing the first end cover from the end of the upper section extracts the locking member from the as least a second knuckle, thereby freeing a side of the lower section to swing open with the elongate hanger supported in the recess of the elongate rack.

16. The mount of claim 13, wherein the locking member includes a spring plunger mounted with one of the first and second knuckles, a distal end of the spring plunger releasably engaging a recess of the other one of the first and second knuckles.

17. The mount of claim 13, wherein:

the upper section further includes at least a third knuckle having a first longitudinal axis aligned with a second longitudinal axis of the at least a first knuckle, the at least a third knuckle spaced apart from the at least a first knuckle;

a space defined between the at least a first knuckle and the at least a third knuckle is sized to receive the second knuckle therebetween; and the lower section can be rotated to a closed position relative to the upper section and the locking member can be engaged with the at least a first knuckle, the at least a second knuckle, and the at least a third knuckle, thereby securing the lower section to the upper section in the closed position.

18. The mount of claim 15, wherein an interior side of the first end cover defines at least a first pair of tines, each of the at least a second pair of tines engaging within one of a pair of receiver channels defined by the upper section, the engagement of the first pair of tines with the pair of receiver channel releasably securing the removeable first end cover to the upper section.

19. The mount of claim 15, wherein:

the locking member defines a slot along a portion of its length, the slot not extending to the distal end of the locking member; and the at least a first knuckle includes a retaining pin positioned to extend into the slot, the retaining pin extending into the slot preventing the locking member from being withdrawn from the bore of the at least a first knuckle.

20. The mount of claim 15, wherein:

the at least a first knuckle defines a first bore adapted to receive the locking member; and the at least a second knuckle defines a second bore adapted to receive the locking member.

21. A mount for coupling a lighting fixture to a hanging structure, comprising:

an upper section adapted to attach to the hanging structure, the upper section including an elongate rack and at least a first knuckle;

a lower section adapted to attach to the lighting fixture, the lower section including an elongate hanger and at least a second knuckle; and a locking member selectively engageable with the at least a first knuckle and the at least a second knuckle; and a removeable first end cover for enclosing an end of the upper section; and a removeable second end cover for enclosing an opposite end of the upper section; and wherein:

the elongate rack defines a recess for releasably receiving and supporting an end of the elongate hanger;

the first end cover defines a base for securing a proximate end of the locking member to the first end cover; and withdrawing the first end cover from the end of the upper section extracts the locking member from the as least a second knuckle, thereby freeing a side of the lower section to swing open with the elongate hanger supported in the recess of the elongate rack.

* * * * *